(12) United States Patent
Kim et al.

(10) Patent No.: US 7,391,485 B2
(45) Date of Patent: *Jun. 24, 2008

(54) LIQUID CRYSTAL DISPLAY DEVICE USING DUAL LIGHT UNIT AND METHOD OF FABRICATING THE SAME

(75) Inventors: Kyeong Jin Kim, Gyeongsangbuk-do (KR); Hoon Kang, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 71 days.

This patent is subject to a terminal disclaimer.

(21) Appl. No.: 10/802,772

(22) Filed: Mar. 18, 2004

(65) Prior Publication Data

US 2004/0183960 A1 Sep. 23, 2004

(30) Foreign Application Priority Data

Mar. 21, 2003 (KR) .................. 10-2003-0017653
May 12, 2003 (KR) .................. 10-2003-0029897
Jun. 2, 2003 (KR) .................. 10-2003-0035398

(51) Int. Cl.
*G02F 1/1335* (2006.01)
*G02F 1/13357* (2006.01)

(52) U.S. Cl. .................. 349/61; 349/63; 349/64; 349/65; 349/96; 349/112; 349/113; 349/179

(58) Field of Classification Search .................. 349/63, 349/64, 65, 68, 96, 112, 113, 61, 62, 179; 362/26, 27, 603, 613

See application file for complete search history.

(56) References Cited

U.S. PATENT DOCUMENTS 5,856,819 A    1/1999  Vossler
5,998,101 A *  12/1999 Park et al. .................. 430/321
6,482,479 B1 * 11/2002 Dubal et al. ................. 428/1.1
6,574,487 B1 *  6/2003 Smith et al. ................. 455/566
6,724,358 B2 *  4/2004 Ban et al. .................... 345/92
7,015,989 B2 *  3/2006 Kim et al. .................... 349/63
7,102,162 B2 *  9/2006 Mai ............................ 257/59
2002/0176036 A1* 11/2002 Kaneko ....................... 349/65
2002/0191135 A1  12/2002 Kim
2005/0046768 A1*  3/2005 Wu ............................. 349/65

FOREIGN PATENT DOCUMENTS

| CN | 1310569   | 8/2001  |
|----|-----------|---------|
| JP | 52-10100  | 1/1977  |
| JP | 55-151685 | 11/1980 |
| JP | 3-200929  | 9/1991  |
| JP | 11-133419 | 5/1999  |

(Continued)

*Primary Examiner*—Dung T. Nguyen
*Assistant Examiner*—Tai Duong
(74) *Attorney, Agent, or Firm*—Morgan, Lewis & Bockius LLP

(57) ABSTRACT

A dual LCD device includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, and a second front light unit attached to a rear side of the liquid crystal panel.

34 Claims, 13 Drawing Sheets

FOREIGN PATENT DOCUMENTS

| | | | | | | |
|---|---|---|---|---|---|---|
| JP | 2000-193956 | 7/2000 | | JP | 2000-357825 | 12/2002 |
| JP | 10 2001 0080974 A | 8/2001 | | JP | 2003-35893 | 2/2003 |
| JP | 2002-62849 | 2/2002 | | JP | 2003-035893 * | 2/2003 |
| | | | | JP | 2003-098545 | 4/2003 |

* cited by examiner

LIQUID CRYSTAL DISPLAY DEVICE USING DUAL LIGHT UNIT AND METHOD OF FABRICATING THE SAME

The present invention claims the benefit of Korean Patent Application Nos. 17653/2003, 29897/2003, and 35398/2003 filed in Korea on Mar. 21, 2003, May 12, 2003, and Jun. 2, 2003, respectively, which are hereby incorporated by reference.

BACKGROUND OF THE INVENTION

1. Field of the Invention

The present invention relates to a liquid crystal display (LCD) device and a method of fabricating an LCD device, and more particularly, to an LCD device having dual light units and a method of fabricating an LCD device having dual light units.

2. Description of the Related Art

In general, LCD devices are flat panel display device having a relatively small size, slim profile, and low power consumption. Accordingly, LCD devices are commonly used in mobile computers, such as notebook computers, office automation machines, and audio/video machines.

The LCD device displays images by manipulating transmission of light through a liquid crystal material by controlling an electric field induced to the liquid crystal material. the LCD device does not necessarily emit the light by itself, but makes use of an external light source. Thus technique is in contrast to other display devices, such as electro-luminescence (EL) devices, cathode ray tube (CRT) devices, and light emitting diode (LED) devices, which emit light on their own.

In general, the LCD devices can be classified into two different categories: transmission LCD devices and reflective LCD devices. The transmission LCD devices include a liquid crystal panel having a liquid crystal layer interposed between two substrates. In addition, the transmission LCD devices include a back light unit that supplies the light to the liquid crystal panel. However, it is difficult to manufacture transmission LCD devices having thin profiles and that are light weight due to the volume and the weight of the back light unit. In addition, the back light unit requires large amounts of electrical power.

Conversely, the reflective LCD devices are not separately provided with light sources, but display images depending on natural (ambient) light conditions. Thus, since the reflective LCD devices do not require any additional light sources, the reflective LCD devices consume small amounts of electrical power and can be widely employed in mobile display devices, such as electronic notes and personal digital assistants (PDA). However, when the ambient light is not sufficient, i.e. at night, a brightness level of the reflective LCD devices is lowered, whereby the information displayed cannot be read. Thus, to overcome this problem, a method of displaying images under dark conditions includes installing a front light unit in the reflective LCD devices.

FIG. 1 is a perspective schematic diagram of a reflective LCD device using a front light unit according to the related art, and FIG. 2 is a cross sectional view of the reflective LCD device of FIG. 1 using a front light unit according to the related art. In FIGS. 1 and 2, an active LCD 100 includes a reflective liquid crystal panel 120 and a front light unit 110 positioned on the reflective liquid crystal panel 120 to provide light. The reflective liquid crystal panel 120 is provided with a first substrate 121 and a second substrate 122, wherein a diffusing reflective electrode 123 is formed on the second substrate 122. The diffusing reflective electrode 123 reflects ambient light supplied from an upper surface of the reflective liquid crystal panel 120 or reflects incident light emitted from the front light unit 110.

The front light unit 110 includes a light source 111, a light guide plate 112, and a reflective mirror 113, wherein the light source 111 generates light. The light guide plate 112 projects the light onto a display surface of the reflective liquid crystal panel 120. The reflective mirror 113 reflects the light generated from the light source 111 to the light guide plate 112.

In FIG. 2, the upper surface of the light guide plate 112 is formed having a prismatic configuration such that the light supplied from the light source 111 is reflected by an upper surface and a lower surface of the light guide plate 112. Then, the light supplied to the light guide plate 112 is supplied along a direction perpendicular to the reflective liquid crystal panel 120 positioned below the light guide plate 112. Next, the light supplied vertically to the reflective liquid crystal panel 120 is reflected by a reflective electrode 123 of the reflective liquid crystal panel 120, and travels upward over the light guide plate 110, thereby displaying an image.

SUMMARY OF THE INVENTION

Accordingly, the present invention is directed to a dual LCD device using a dual light unit that substantially obviates one or more problems due to limitations and disadvantages of the related art.

An object of the present invention is to provide a dual LCD device that uses one liquid crystal panel to display images on both front and rear sides.

Another object of the present invention is to provide a method of fabricating a dual LCD device that uses one liquid crystal panel to display images on both front and rear sides.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a dual LCD device includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, and a second front light unit attached to a rear side of the liquid crystal panel.

In another aspect, a dual LCD device includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, a second front light unit attached to a rear side of the liquid crystal panel, and a fine reflecting and scattering film prepared between the first polarizing plate and the first front light unit and/or between the second polarizing plate and the second front light unit.

In another aspect, a dual LCD device includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, a second front light unit attached to a rear side of the liquid crystal panel, and a scattering film prepared between one of the first polarizing plate and the first front light unit, and the second polarizing plate and the second front light unit.

In another aspect, a method of fabricating a dual LCD device includes providing a liquid crystal panel having a liquid crystal layer interposed between a first substrate and a second substrate, providing first and second polarizing plates on opposing surfaces of the liquid crystal panel, providing a first front light unit on a front side of the liquid crystal panel, and providing a second front light unit on a rear side of the liquid crystal panel.

In another aspect, a method of fabricating a dual LCD device includes providing a liquid crystal panel having a liquid crystal layer interposed between a first substrate and a second substrate, providing first and second polarizing plates to opposing surfaces of the liquid crystal panel, providing a first front light unit on a front side of the liquid crystal panel, providing a second front light unit on a rear side of the liquid crystal panel, and providing a fine reflecting and scattering film between one of the first polarizing plate and the first front light unit, and the second polarizing plate and the second front light unit.

In another aspect, a method of fabricating a dual LCD device includes providing a liquid crystal panel having a liquid crystal layer interposed between a first substrate and a second substrate, providing first and second polarizing plates to opposing surfaces of the liquid crystal panel, providing a first front light unit on a front side of the liquid crystal panel, providing a second front light unit on a rear side of the liquid crystal panel, and providing a fine reflecting and scattering film between one of the first polarizing plate and the first front light unit, and the second polarizing plate and the second front light unit.

In another aspect, a method of fabricating a dual LCD device includes providing a liquid crystal panel having a liquid crystal layer interposed between a first substrate and a second substrate, providing first and second polarizing plates on opposing surfaces of the liquid crystal panel, providing a first front light unit on a front side of the liquid crystal panel, providing a second front light unit on a rear side of the liquid crystal panel, and providing a scattering film between one of the first polarizing plate and the first front light unit, and the second polarizing plate and the second front light unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
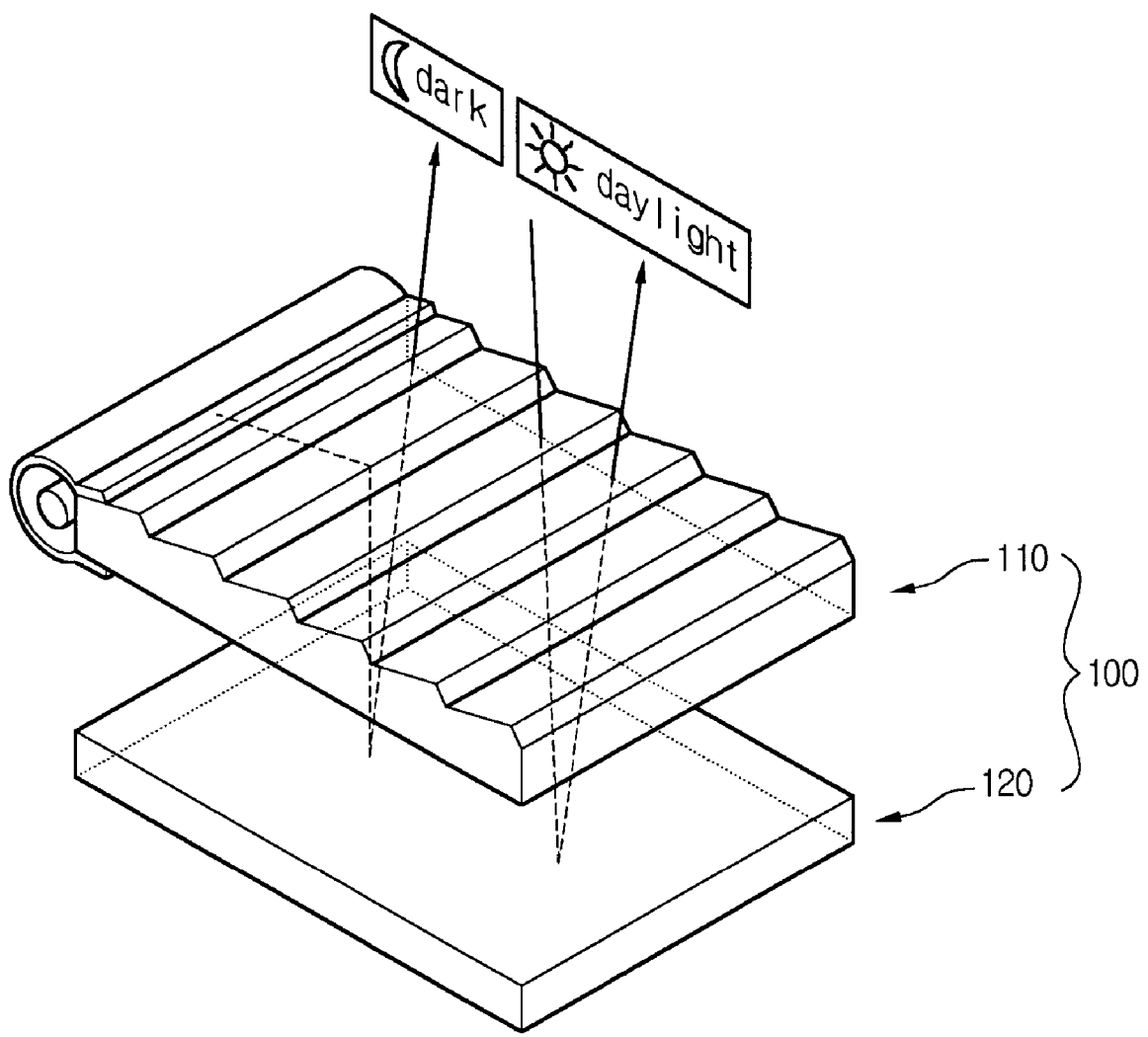
FIG. 1 is a perspective schematic diagram of a reflective LCD device using a front light unit according to the related art.
Figure 2:
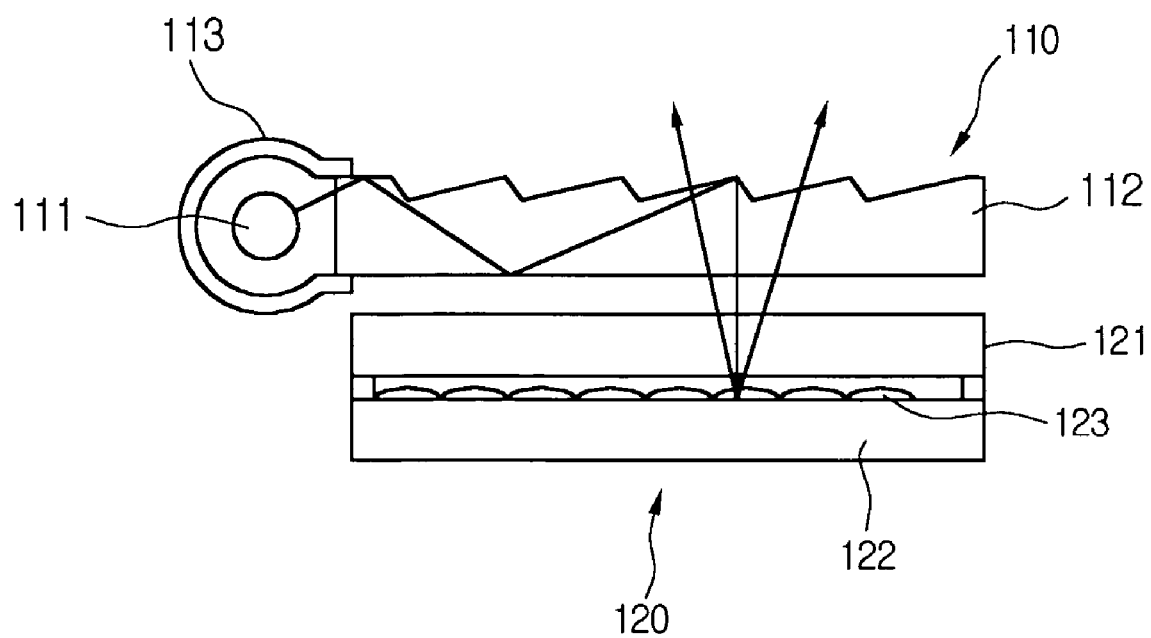
FIG. 2 is a cross sectional view of the reflective LCD device of FIG. 1 using a front light unit according to the related art.
Figure 3:
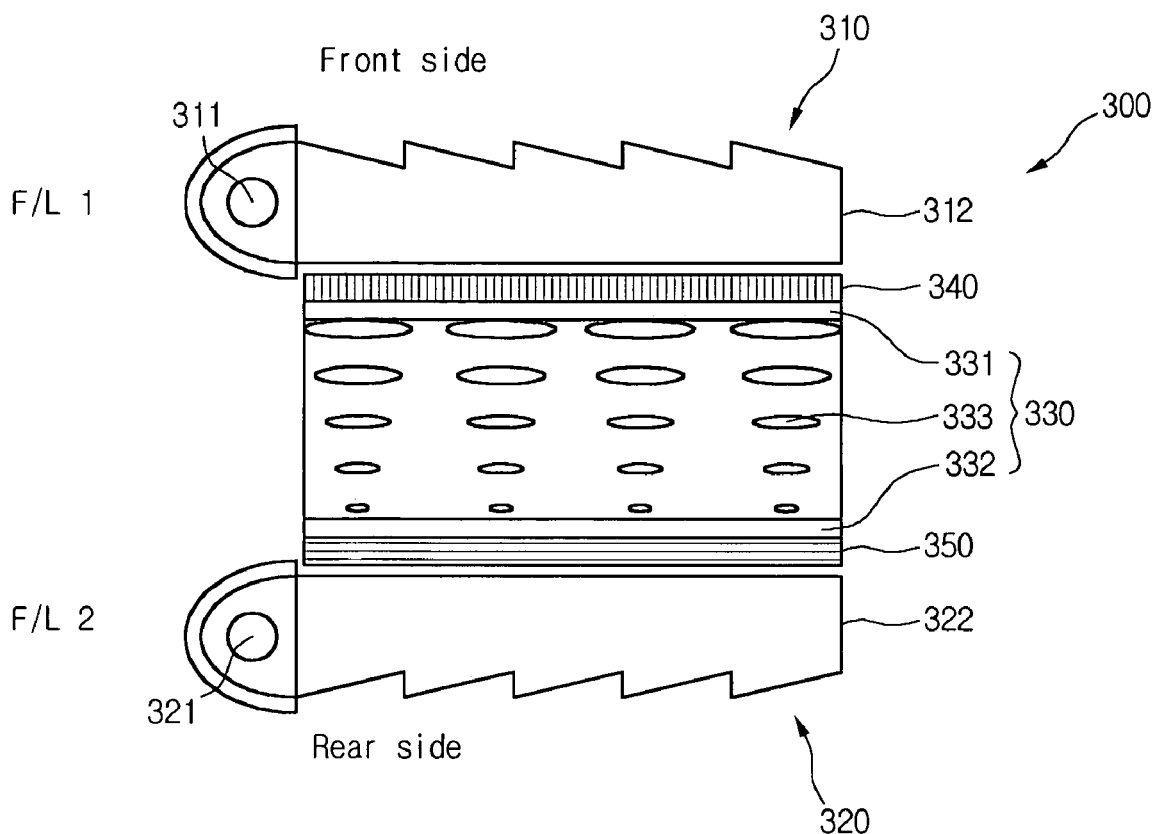
FIG. 3 is a schematic cross sectional view of an exemplary dual LCD device according to the present invention.

FIG. 3 is a schematic cross sectional view of an exemplary dual LCD device according to the present invention. In FIG. 3, a dual LCD device 300 may include a liquid crystal panel 330, a first polarizing plate 340, a second polarizing plate 350, a first front light unit 310, and a second front light unit 320. The liquid crystal panel 330 may be formed by filling a liquid crystal layer 333 between a first substrate 331 and a second substrate 332. In addition, the first polarizing plate 340 and the second polarizing plate 350 may be attached to both surfaces of the liquid crystal panel 330. For example, the first front light unit 310 may be attached to a front side of the liquid crystal panel 330, and the second front light unit 320 may be attached to a rear side of the liquid crystal panel 330.

In FIG. 3, the exemplary liquid crystal panel 330 may be a transmission-type display device, wherein the first substrate 331, such as a color filter substrate, and the second substrate 332, such as a thin film transistor substrate, may be spaced from each other with a predetermined distance in between. In the liquid crystal panel 330, the second substrate 332 may be a transparent substrate having an inner surface upon which gate bus lines and data bus lines are formed in matrix configuration. In addition, a thin film transistor (TFT), which may function as a switching device, may be formed adjacent to each crossing of the gate bus lines and the data bus lines. A pixel electrode, which may contact a drain electrode of the TFT, may be formed at a position defined by the gate bus line and the data bus line. The first substrate 331 may be provided at a location facing the second substrate 332, and may include a transparent substrate having an inner surface upon which a black matrix, a color filter layer, and a common electrode may be formed.

Accordingly, if a voltage is supplied to one gate bus line and one data bus line of the liquid crystal panel 330, as described above, then only the TFT to which the voltage is supplied is turned ON. Accordingly, a charge is stored on the pixel electrode connected to the drain electrode of the TFT, thereby changing angles of liquid crystal molecules filled between common electrode and the drain electrode (i.e., pixel electrode). Through this process, the LCD device may display images on the liquid crystal panel 330 by control an electric field induced to the liquid crystal material in order to transmit light or prevent light from passing through the liquid crystal material. For example, the liquid crystal panel 330 may be operated in twist nematic (TN) mode.

In FIG. 3, both sides of the liquid crystal panel 330 may be further provided with the first polarizing plate 340 and the second polarizing plate 350. For example, the first and second polarizing plates 340 and 350 may be attached to both surfaces of the liquid crystal panel 330 so that an optical axis of the first polarizing plate 340 may be perpendicular to an optical axis of the second polarizing plate 350. Although not shown, a compensation plate may be further formed on both surfaces of the liquid crystal panel 330.

The first and second polarizing plates 340 and 350 may transmit only light vibrating along one direction so as to polarize ambient light. The compensation plate (not shown) may be provided to compensate for phase changes of light within the liquid crystal molecules, thereby solving viewing angle problems. In addition, the compensation plate may be uniaxial or may be biaxial.

In FIG. 3, the first front light unit 310 provided on the front side of the liquid crystal panel 330 may include a light source 311 and a light guide plate 312. Accordingly, linear light projected from the light source 311 of the first front light unit 310 may be supplied to the light guide plate 312 to form a uniform surface light source. In addition, since the upper surface of the light guide plate 312 may be formed in a prismatic configuration, the light supplied from the light source 311 may be reflected by an upper surface and a lower surface within the light guide plate 312 and pass through the light guide plate 312. Then, the light supplied to the light guide plate 312 may be supplied along a vertical direction to the liquid crystal panel 330. In addition, a second front light unit 320 may be provided at an opposing surface of the liquid crystal panel 330, and may include a second light source 321 having a second light guide plate 322.

Figure 4:
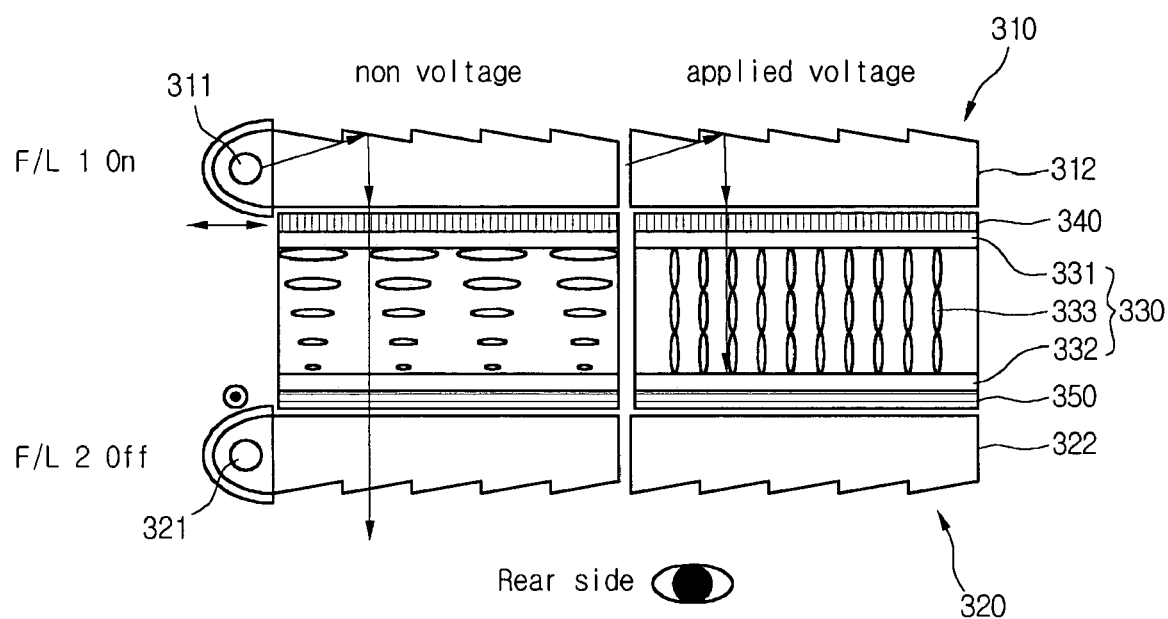
FIG. 4 is a schematic cross sectional view of another exemplary dual LCD device according to the present invention.
Figure 5:
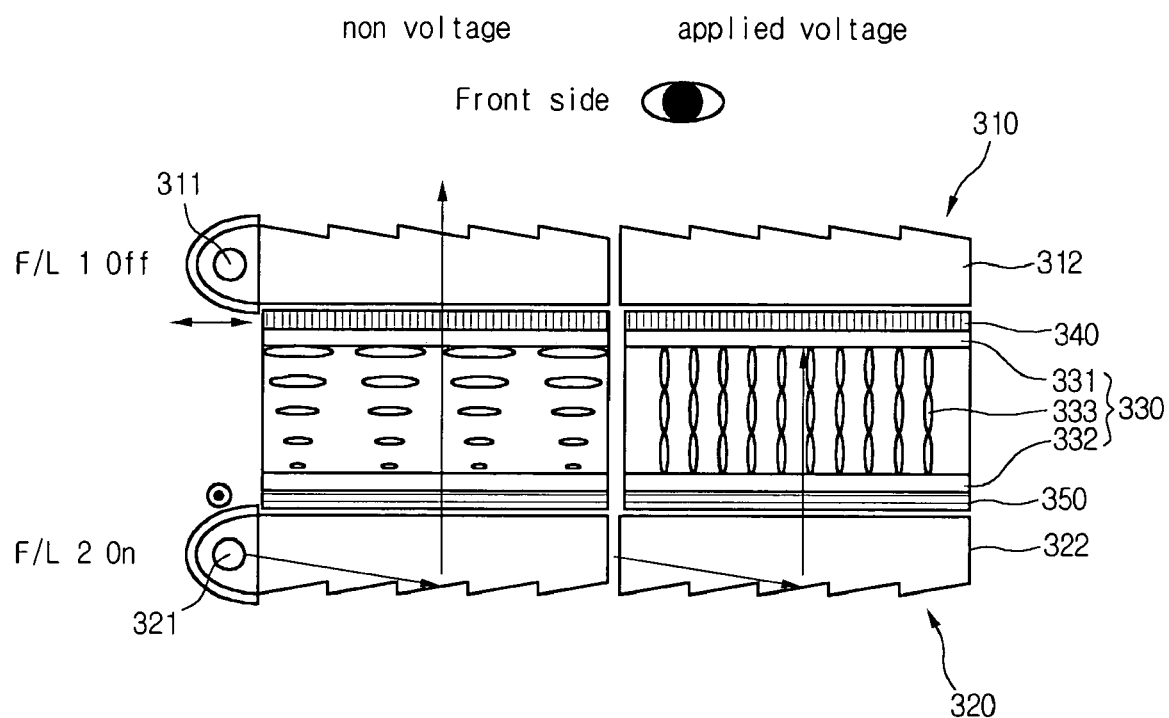
FIG. 5 is a schematic cross sectional view of another exemplary dual LCD device according to the present invention.

FIG. 4 is a schematic cross sectional view of another exemplary dual LCD device according to the present invention, and FIG. 5 is a schematic cross sectional view of another exemplary dual LCD device according to the present invention. In FIG. 4, an image may be displayed at a rear side of an LCD device when a first front light unit is turned ON, according to the present invention. In FIG. 5, an image may be displayed on a front side of an LCD device when a second front light unit is turned ON, according to the present invention.

In FIG. 4, if a first front light unit 310 is turned ON and the liquid crystal panel 330 is in a normally white mode, and if no voltage is supplied to the liquid crystal panel 330, then light emitted from the first front light unit 310 may be transmitted through the rear side of the liquid crystal panel 330. For example, the light emitted from the first front light unit 310 may be transmitted through the first polarizing plate 340 provided on a side of the liquid crystal panel 330, and may be converted into linearly polarized light. Then, the transmitted light may be rotated along a liquid crystal molecular arrangement by about 90°, and may travel in parallel with an optical axis of the second polarizing plate 350 provided on the other side of the liquid crystal panel 330. Accordingly, the light transmitted through the liquid crystal panel 330 may be transmitted through the second polarizing plate 350 so that an image may be displayed on the rear side of the LCD.

However, as shown in FIG. 4, when a voltage is supplied to the liquid crystal panel 330, the liquid crystal molecules arise along a direction of the applied electric field. Thus, the light that is linearly polarized along a direction by the first polarizing plate 340 maintains its polarization state, and may be supplied to the second polarizing plate 350. Accordingly, the light emitted from the first front light unit 310 may be screened by the second polarizing plate 350, and may not reach the rear side of the LCD. As shown in FIG. 4, the liquid crystal panel 330 may function in a TN mode, such that the first front light 311 is in an ON state and an image displayed on the rear side of the liquid crystal panel 330 is in a black mode (i.e., "applied voltage"). Similarly, the second front light 321 is in an OFF state, and an image displayed on the front side of the liquid crystal panel 330 is in a white mode (i.e., "non voltage").

Accordingly, the amount of the light that is transmitted through the liquid crystal panel 330 may be adjusted by selectively controlling the light supplied to the liquid crystal panel 330. Thus, a desired image may be displayed on the rear side of the LCD by controlling the voltage supplied to the liquid panel 330 of a dual LCD device, according to the present invention, and may determine whether to supply power to a first front light unit 310.

In FIG. 5, if a second front light unit 320 is turned ON and the liquid crystal panel 330 is in a normally white mode, and if no voltage is supplied to the liquid crystal panel 330, then the light emitted from the second front light unit 320 may be transmitted through the front side of the liquid crystal panel 330. For example, the light emitted from the second front light unit 320 may be transmitted through the second polarizing plate 350 provided on a side of the liquid crystal panel 330, and may be converted into linearly polarized light. Then, the transmitted light may be rotated along a liquid crystal molecular arrangement by about 90°, and may travel in parallel with an optical axis of the first polarizing plate 340 provided on the other side of the liquid crystal panel 330. Accordingly, the light that transmitted through the liquid crystal panel 330 may be transmitted to the first polarizing plate 340 so that an image may be displayed on the front side of the LCD.

However, as shown in FIG. 5, when a voltage is supplied to the liquid crystal panel 330, the liquid crystal molecules arise along a direction of the applied electric field. Thus, the light that is linearly polarized in a direction by the second polarizing plate 350 maintains its polarization state, and may be supplied to the first polarizing plate 340. Accordingly, the light emitted from the second front light unit 320 may be screened by the first polarizing plate 340, and may not reach the front side of the LCD. As shown in FIG. 5, the liquid crystal panel 330 may function in a TN mode, such that the second front light 321 is in an ON state and an image displayed on the front side of the liquid crystal panel 330 is in a black mode (i.e., "applied voltage"). Similarly, the first front light 311 is in an OFF state, and an image displayed on the rear side of the liquid crystal panel 330 is in a white mode (i.e., "non voltage").

According to the present invention, an image may be selectively displayed on the front or the rear side of the liquid crystal panel 330 according to whether the first front light 310 or the second front light 320 of the dual LCD device is turned ON. Accordingly, a dual LCD device may be applied to various types of display devices.

Figure 6:
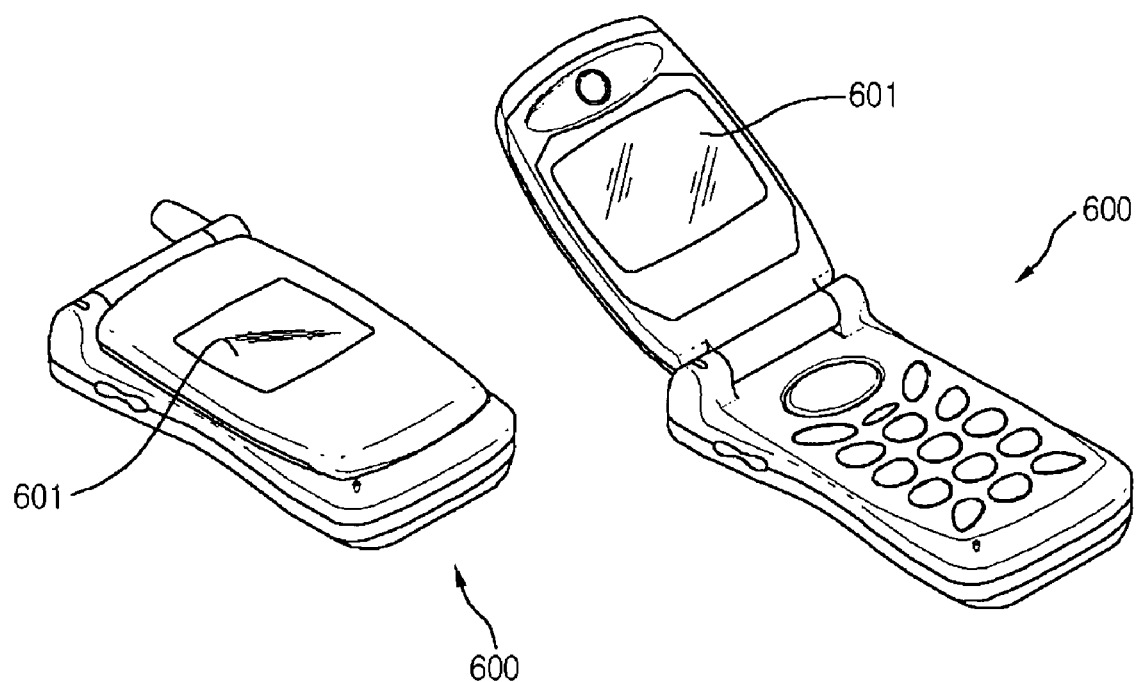
FIG. 6 is a perspective view of exemplary mobile communication terminals according to the present invention.

FIG. 6 is a perspective view of exemplary mobile communication terminals according to the present invention. In FIG. 6, a mobile communication terminal 600 may employ a dual LCD device 601 according to the present invention. Accordingly, an image may be displayed on the front and rear sides of the liquid crystal panel by using a liquid crystal panel, so that a light weight and thin profile dual display-type mobile communication terminal 600 may be configured. As described above, the dual LCD device using a dual front light unit, according to the present invention, may be a transmission-type LCD device having front light units on both sides thereof, so that high quality images may be displayed on the front side and the rear side of the LCD by using a single liquid crystal panel.

Meanwhile, when the dual LCD device using dual front light units is applied to the mobile communication terminal described above, the following problems may occur. If an image is displayed using a transmission-type LCD device in bright ambient conditions that are brighter than the light emitted from the first front light unit, the image displayed on the rear side of the LCD may not be seen very well. To overcome this problem, a dual LCD device including a fine reflecting and scattering film may be used.

Figure 7:
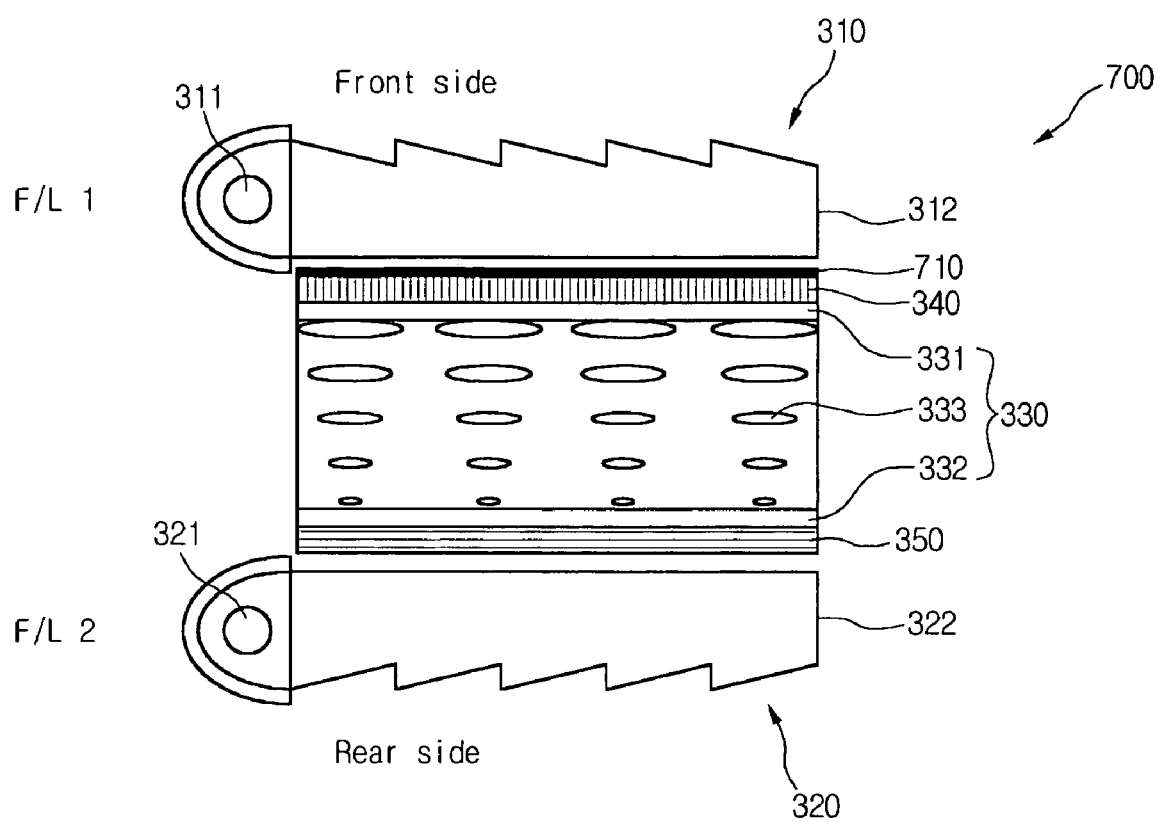
FIGS. 7-10 are schematic cross sectional views of other exemplary dual LCD devices according to the present invention.

FIGS. 7-10 are schematic cross sectional views of other exemplary dual LCD devices according to the present invention. In FIG. 7, a dual LCD 700 may include a liquid crystal panel 330, a first polarizing plate 340, a second polarizing plate 350, a first front light unit 310, a second front light unit 320, and a fine reflecting and scattering film 710. The liquid crystal panel 330 may be formed by filling a liquid crystal layer 333 between a first substrate 331 and a second substrate 332, and the first polarizing plate 340 and the second polarizing plate 350 may be attached to both surfaces of the liquid crystal panel 330. In addition, the first front light unit 310 may be attached to a front side of the liquid crystal panel 330, and the second front light unit 320 may be attached to a rear side of the liquid crystal panel 330. Thus, the fine reflecting and scattering film 710 may be prepared between the first polarizing plate 340 and a first front light unit 310.

When an image is displayed on the rear side of the LCD 700 due to a transmission light generated by a light emitted from the first front light unit 310, the fine reflecting and scattering film 710 may reflect, to the rear side, ambient light supplied from the rear side of the LCD 700 to the liquid crystal panel 330. However, if an image is displayed on the rear side of the transmission LCD 700 in bright ambient conditions and a brightness of the light emitted from the first front light unit 310 is relatively darker than the bright ambient conditions, then the image displayed on the rear side of the LCD 700 may not be seen very well. Accordingly, the fine reflecting and scattering film 710 may be prepared between the first polarizing plate 340 and a first front light unit 310 to solve such a problem. For example, when the ambient light is relatively bright, the fine reflecting and scattering film 710 may reflect the ambient light to the rear side of the liquid crystal panel 330 so that optical efficiency may be enhanced. Thus, the brightness of the image displayed on the rear side of the liquid crystal panel 330 may be enhanced.

The fine reflecting and scattering film 710 may also scatter the transmitted light. Accordingly, the fine reflecting and scattering film 710 may prevent Moiré phenomenon from occurring, wherein straight or ill-defined lines are generated due to a predetermined pattern of the light guide plate 312 of the first front light unit 310 on a screen on which the image is displayed. As commonly known, the Moiré phenomenon is known as an interference fringe created when periodic patterns are mutually overlapped with each other. When two or more lattices having similar lattice constants are overlapped with each other and light is irradiated onto the lattices, straight or ill-defined lines having larger periods different from periods of the lattices are generated. The material of the fine reflecting and scattering film 710 may include a Ultra Brightness (UB) film.

Figure 8:
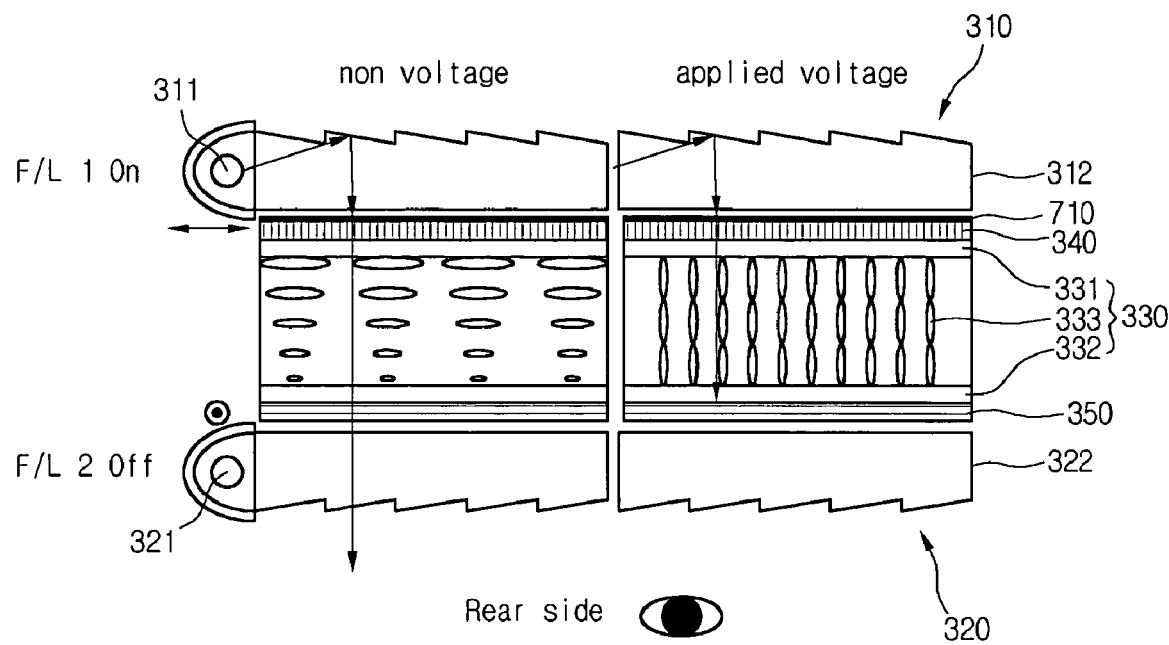
Figure 9:
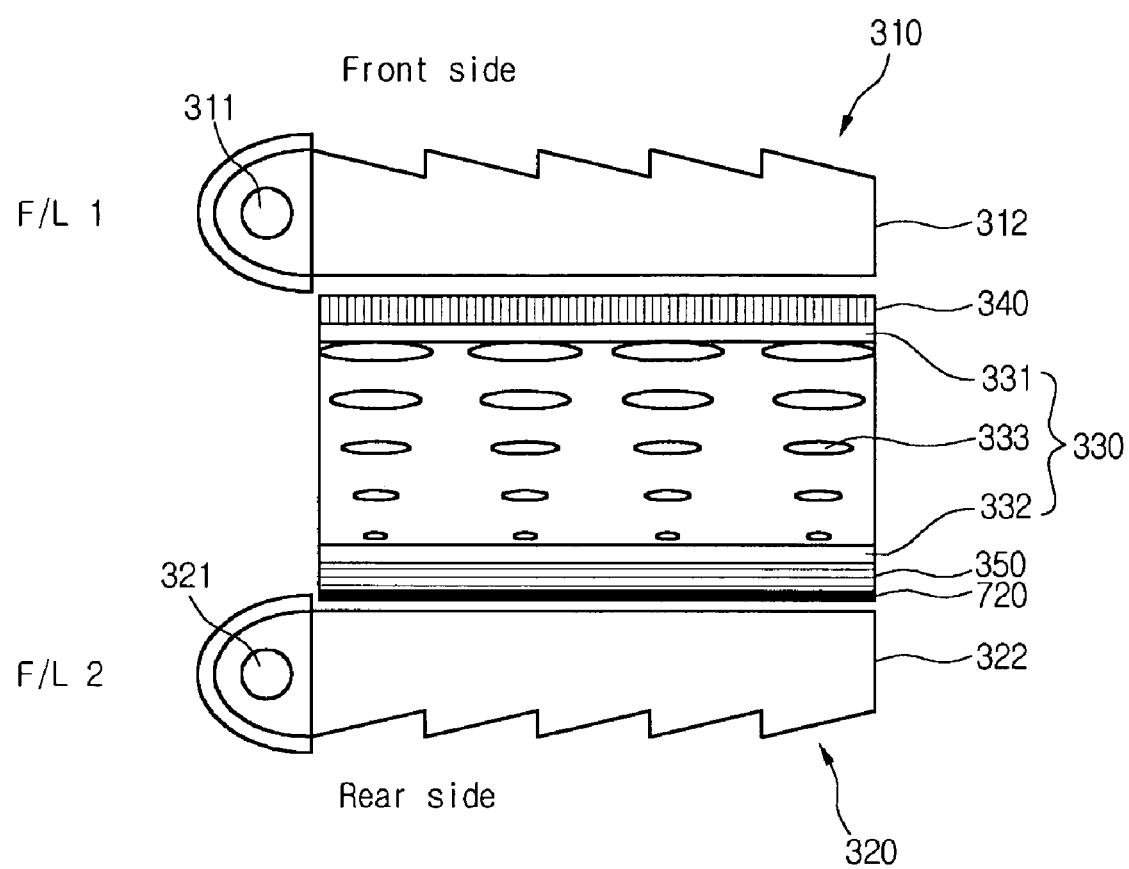

In FIG. 8, if a first front light unit 310 is turned ON and the liquid crystal panel 330 is in a normally white mode, and if no voltage is supplied to the liquid crystal panel 330, then the light emitted from the first front light unit 310 may be transmitted through the rear side of the liquid crystal panel 330. For example, the light emitted from the first front light unit 310 may be transmitted through the first polarizing plate 340 provided on a side of the liquid crystal panel 330, and may be converted into linearly polarized light. The transmitted light may be rotated along a liquid crystal molecular arrangement by about 90°, and may travel in parallel with an optical axis of the second polarizing plate 350 provided on the other side of the liquid crystal panel 330. Accordingly, the light that transmitted through the liquid crystal panel 330 may be transmitted to the second polarizing plate 350 so that an image may be displayed on the rear side of the LCD. Thus, when a user sees an image displayed on the rear side of the liquid crystal panel 330 in bright ambient conditions, visibility is excellent and a clear image may be provided due to the external light reflected by the fine reflecting and scattering film 710.

In FIG. 8, when a voltage is supplied to the liquid crystal panel 330, the liquid crystal molecules arise along a direction of an applied electric field. Thus, light that is linearly polarized along a direction by the first polarizing plate 340 may maintain its polarization state and may be supplied to the second polarizing plate 350. Accordingly, the light emitted from the first front light unit 310 may be screened by the second polarizing plate 350 and may not reach the rear side of the LCD.

According to the present invention, the amount of the light that is transmitted through the liquid crystal panel 330 may be adjusted by selectively controlling the light supplied to the liquid crystal panel 330. Thus, a desired image may be displayed on the rear side of the LCD by controlling the voltage supplied to the liquid panel 330 of the dual LCD device, according to the present invention, and may determine whether to supply power to a first front light unit 310.

In FIGS. 7 and 8, the dual LCD device may employ the fine reflecting and scattering film 710 to prevent the problems where a displayed image is difficult to distinguish due to the ambient light supplied from the rear side of the LCD when an image is displayed on the rear side of the LCD. However, as described and shown in FIG. 5, even when an image is displayed on the front side of the dual LCD, if the ambient light is brighter than the light emitted from the second front light unit 320, the image displayed on the front side of the LCD may not be seen very well.

Figure 10:
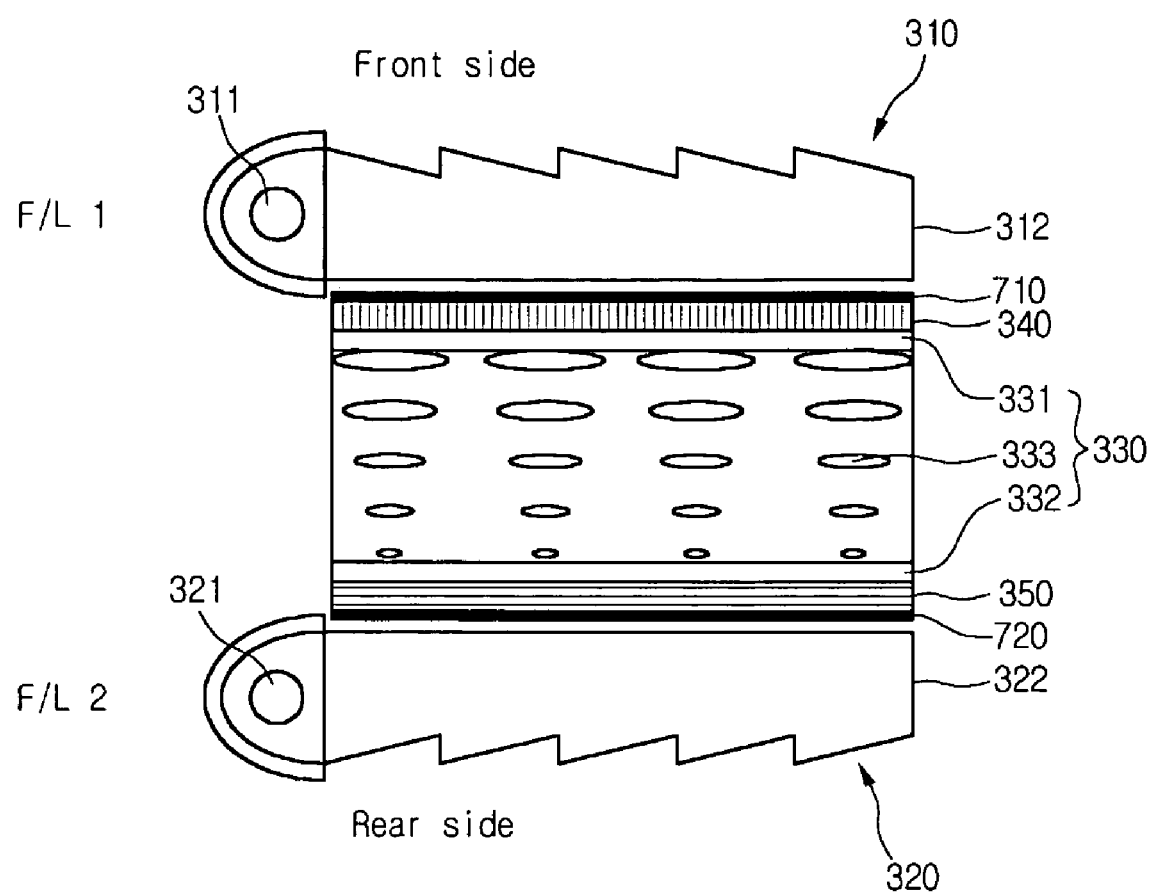

To overcome this problem, a dual LCD device including a fine reflecting and scattering film 710 prepared between the second polarizing plate 350 and a second front light unit 320 may be provided. The function of the fine reflecting and scattering film 710 will be described with reference to FIGS. 7 and 8. Since only the prepared locations of the fine reflecting and scattering films 710 and 720 (shown in FIG. 9) are different from each other, the detailed description on the dual LCD device shown in FIG. 9 will be omitted. As shown in FIG. 10, the fine reflecting and scattering films 710 and 720 may be prepared on the front side and the rear side of the dual LCD device.

Figure 11:
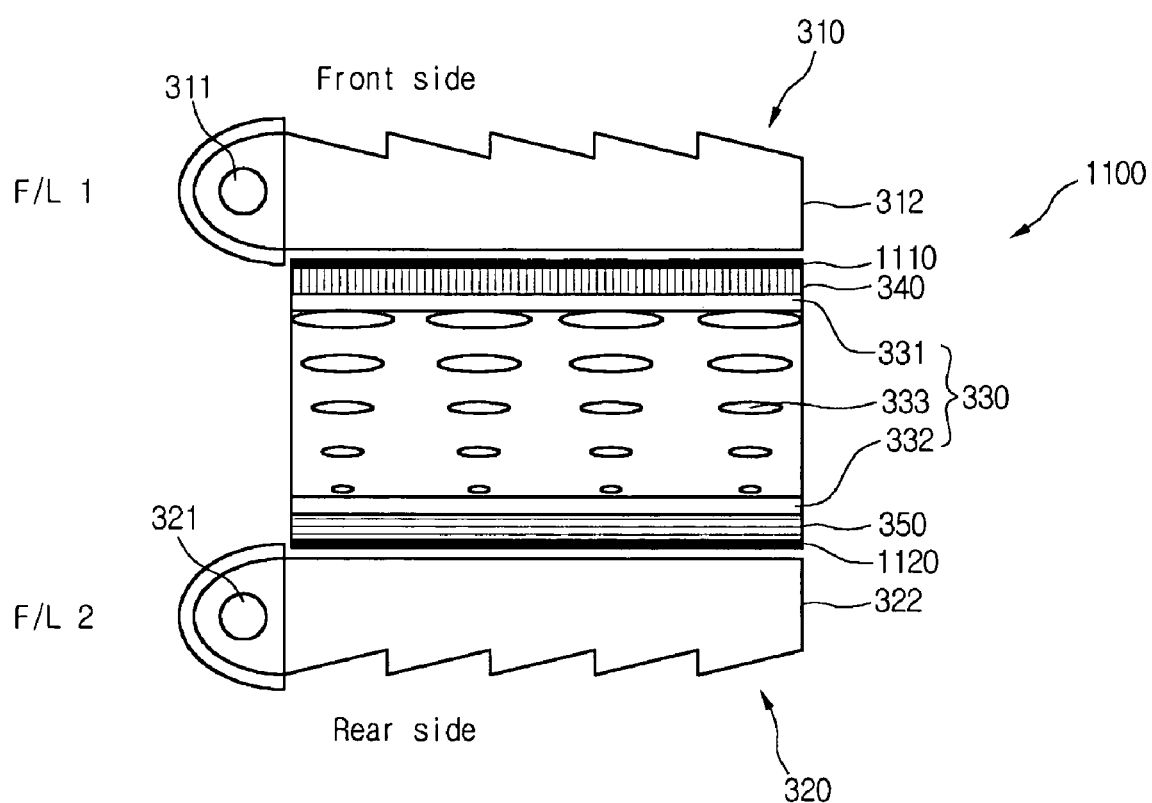
FIG. 11 is a schematic cross sectional view of another exemplary dual LCD device according to the present invention.

FIG. 11 is a schematic cross sectional view of another exemplary dual LCD device according to the present invention. In FIG. 11, a dual LCD device 1100 may include a liquid crystal panel 330, a first polarizing plate 340, a second polarizing plate 350, a first front light unit 310, a second front light unit 320, a first scattering film 1110, and a second scattering film 1120. The liquid crystal panel 330 may be formed by filling a liquid crystal layer 333 between a first substrate 331 and a second substrate 332, wherein the first polarizing plate 340 and the second polarizing plate 350 may be attached to both surfaces of the liquid crystal panel 330. In addition, the first front light unit 310 may be attached to a front side of the liquid crystal panel 330, and the second front light unit 320 may be attached to a rear side of the liquid crystal panel 330. The first scattering film 1110 may be prepared between the first polarizing plate 340 and a first front light unit 310, and the second scattering film 1120 may be prepared between the second polarizing plate 350 and a second front light unit 320.

Since the first scattering film 1110 may be prepared between the first polarizing plate 340 and a first front light unit 310, Moiré phenomenon may be prevented from occurring to make the image displayed on the rear side of the liquid crystal panel 330 clear. Similarly, since the second scattering film 1120 may be prepared between the second polarizing plate 350 and a second front light unit 320, Moiré phenomenon may be prevented from occurring to make the image displayed on the front side of the liquid crystal panel 330 clear. According to the present invention, the dual LCD device 1110, as shown in FIG. 11, may include the first scattering film 1110 and the second scattering film 1120 so that the clearness of the images displayed on both sides of the liquid panel 330 can be both improved.

According to the exemplary embodiments described above, the dual LCD device having a liquid crystal panel may be operating in a TN mode. However, the liquid crystal panel may be operated in various different modes besides the TN mode. For example, the dual LCD device may be operated in an in-plane switching (IPS) mode and a vertical alignment (VA) mode.

Figure 12:
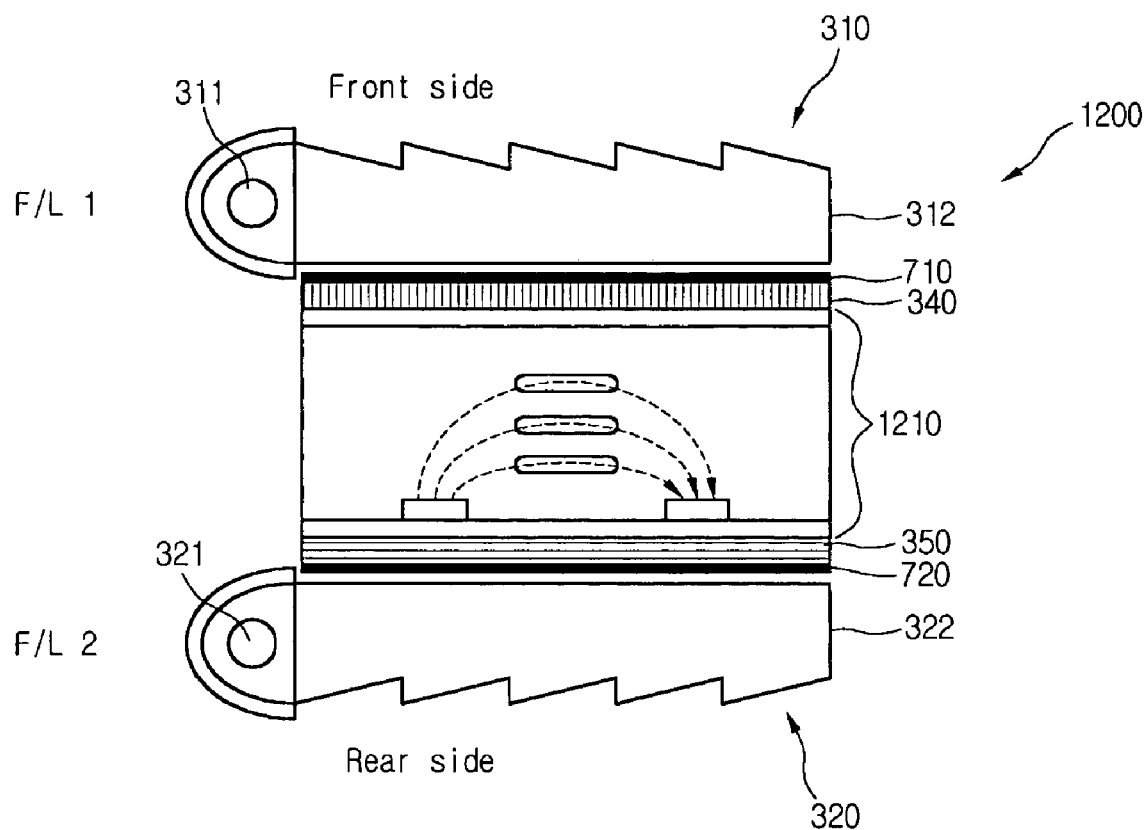
FIG. 12 is a schematic cross sectional view of another exemplary dual LCD device according to the present invention.
Figure 13:
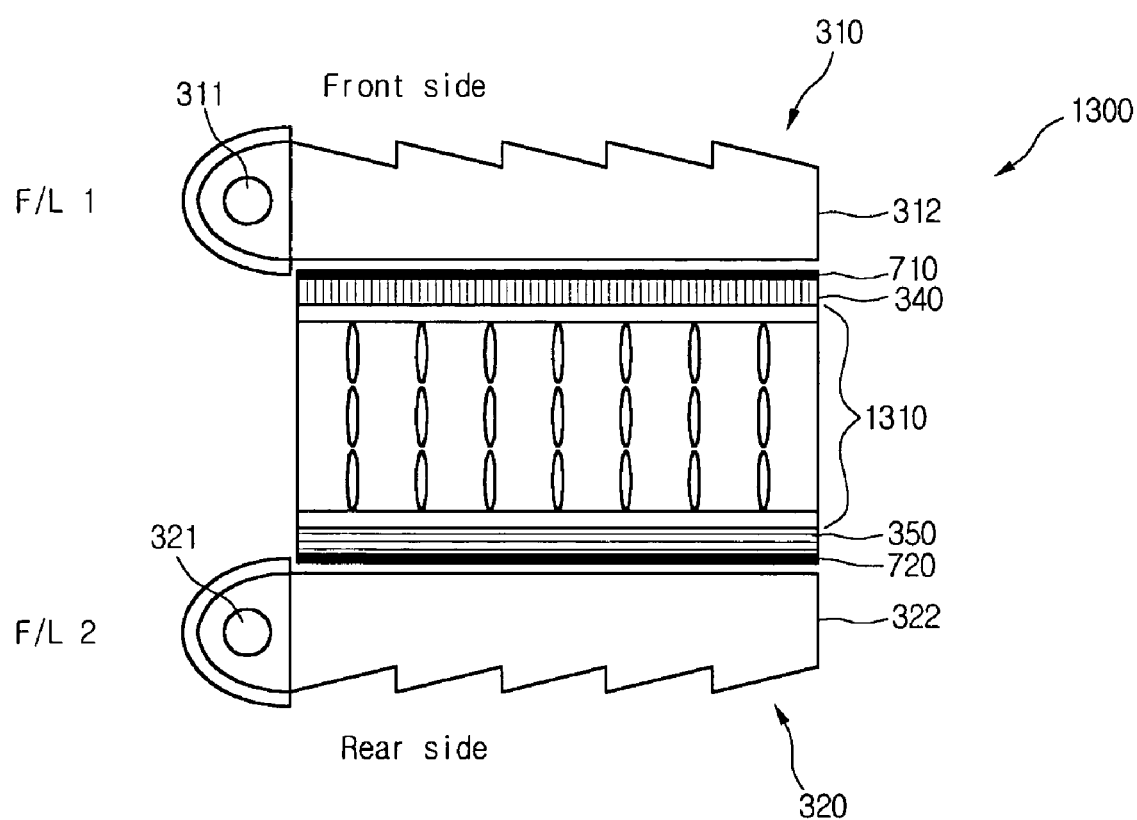
FIG. 13 is a schematic cross sectional view of another exemplary dual LCD device according to the present invention.

FIG. 12 is a schematic cross sectional view of another exemplary dual LCD device according to the present invention. In FIG. 12, a dual LCD device using a dual front light unit and provided with a liquid crystal panel may be operated in an IPS mode. FIG. 13 is a schematic cross sectional view of another exemplary dual LCD device according to the present invention. In FIG. 13, a dual LCD device using a dual front light unit and provided with a liquid crystal panel may be operating in a VA mode.

In FIG. 12, a dual LCD device 1200 operating in an IPS mode may include an IPS mode liquid crystal panel 1210, a first polarizing plate 340, a second polarizing plate 350, a first front light unit 310, a second front light unit 320, a first fine reflecting and scattering film 710, and a second fine reflecting and scattering film 720. The IPS mode liquid crystal panel 1210 may include manipulating liquid crystal molecules due to applied horizontal electric fields. The first polarizing plate 340 and the second polarizing plate 350 may be attached to both surfaces of the IPS mode liquid crystal panel 1210. In addition, the first front light unit 310 may be attached to a front side of the IPS mode liquid crystal panel 1210, and the second front light unit 320 may be attached to a rear side of the IPS mode liquid crystal panel 1210. The first fine reflecting and scattering film 710 may be prepared between the first polarizing plate 340 and a first front light unit 310, and the second fine reflecting and scattering film 720 may be prepared between the second polarizing plate 350 and a second front light unit 320.

In the dual LCD device 1200 according to FIG. 12, a first image may be displayed on the rear side of the dual LCD 1200 due to the operation of the first front light unit 310, and a second image may be displayed on the front side of the dual LCD device 1200 due to the operation of the second front light unit 320. Since the function of the components of the dual LCD device 1200 shown in FIG. 12 is similar to the dual LCD devices described above, the detailed description will be omitted for the sake of brevity.

In FIG, 13, a dual LCD device 1300 operating in a VA mode may include a VA mode liquid crystal panel 1310, a first polarizing plate 340, a second polarizing plate 350, a first front light unit 310, a second front light unit 320, a first fine reflecting and scattering film 710, and a second fine reflecting and scattering film 720. The first polarizing plate 340 and the second polarizing plate 350 may be attached to both surfaces of the VA mode liquid crystal panel 1310. In addition, the first front light unit 310 may be attached to a front side of the VA mode liquid crystal panel 1310, and the second front light unit 320 may be attached to a rear side of the VA mode liquid crystal panel 1310. The first fine reflecting and scattering film 710 may be prepared between the first polarizing plate 340 and a first front light unit 310, and the second fine reflecting and scattering film 720 may be prepared between the second polarizing plate 350 and a second front light unit 320.

In the dual LCD device 1300 of FIG. 13, a first image may be displayed on the rear side of the dual LCD device 1300 due to the operation of the first front light unit 310, and a second image may be displayed on the front side of the dual LCD 1300 due to the operation of the second front light unit 320. Since the function of the components of the dual LCD device 1300 shown in FIG. 13 is similar to the dual LCD devices described above, the detailed description will be omitted for the sake of brevity.

It will be apparent to those skilled in the art that various modifications and variations can be made in the liquid crystal display device using a dual light unit of the present invention without departing from the spirit or scope of the invention. Thus, it is intended that the present invention covers the modifications and variations of this invention provided they come within the scope of the appended claims and their equivalents.

What is claimed is:

1. A dual LCD device, comprising:
   a liquid crystal panel having a liquid crystal layer interposed between a first substrate and a second substrate;
   first and second polarizing plates attached to opposing surfaces of the liquid crystal panel;
   a first front light unit having a first side attached to a front side of the liquid crystal panel; and
   a second front light unit having a first side attached to a rear side of the liquid crystal panel,
   wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations,
   wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and
   wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

2. The device according to claim 1, wherein the first and second polarizing plates are attached to both surfaces of the liquid crystal panel such that optical axes of the first and second polarizing plates are perpendicular to each other.

3. The device according to claim 1, wherein the first front light unit is operated to cause a first image to be displayed on the rear side of the liquid crystal panel, and the second front light unit is operated to cause a second image to be displayed on the front side of the liquid crystal panel.

4. A dual LCD device, comprising:
   a liquid crystal panel having a liquid crystal layer interposed between a first substrate and a second substrate;

first and second polarizing plates attached to opposing surfaces of the liquid crystal panel;

a first front light unit having a first side attached to a front side of the liquid crystal panel;

a second front light unit having a first side attached to a rear side of the liquid crystal panel; and a fine reflecting and scattering film prepared between one of the first polarizing plate and the first front light unit, and the second polarizing plate and the second front light unit, wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations, wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

5. The device according to claim 4, wherein the first and second polarizing plates are attached to both surfaces of the liquid crystal panel such that optical axes of the first and second polarizing plates are perpendicular to each other.

6. The device according to claim 4, wherein the first front light unit is operated to cause a first image to be displayed on the rear side of the liquid crystal panel, and the second front light unit is operated to cause a second image to be displayed on the front side of the liquid crystal panel.

7. The device according to claim 4, wherein the fine reflecting and scattering film is prepared between the first polarizing plate and the first front light unit and receives ambient light supplied from the rear side of the liquid crystal panel and reflects the received ambient light to the rear side of the liquid crystal panel.

8. The device according to claim 7, wherein the fine reflecting and scattering film is prepared between the first polarizing plate and the first front light unit and enhances a brightness of the image displayed on the rear side of the liquid crystal panel.

9. The device according to claim 4, wherein the fine reflecting and scattering film is prepared between the second polarizing plate and the second front light unit and receives ambient light supplied from the front side of the liquid crystal panel and reflects the received ambient light to the front side of the liquid crystal panel.

10. The device according to claim 9, wherein the fine reflecting and scattering film is prepared between the second polarizing plate and the second front light unit and enhances a brightness of the image displayed on the front side of the liquid crystal panel.

11. The device according to claim 4, wherein the fine reflecting and scattering film is prepared between the first polarizing plate and the first front light unit and prevents Moiré phenomenon from occurring when an image is displayed on the rear side of the liquid crystal panel due to a light emitted from the first front light unit.

12. The device according to claim 4, wherein the fine reflecting and scattering film is prepared between the second polarizing plate and the second front light unit and prevents Moiré phenomenon from occurring when an image is displayed on the front side of the liquid crystal panel due to a light emitted from the second front light unit.

13. A dual LCD device, comprising:
a liquid crystal panel having a liquid crystal layer interposed between a first substrate and a second substrate;

first and second polarizing plates attached to opposing surfaces of the liquid crystal panel;

a first front light unit having a first side attached to a front side of the liquid crystal panel;

a second front light unit having a first side attached to a rear side of the liquid crystal panel; and a scattering film prepared between one of the first polarizing plate and the first front light unit, and the second polarizing plate and the second front light unit, wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations, wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

14. The device according to claim 13, wherein the first and second polarizing plates are attached to both surfaces of the liquid crystal panel so that optical axes of the polarizing plates are perpendicular to each other.

15. The device according to claim 13, wherein the first front light unit is operated to cause a first image to be displayed on the rear side of the liquid crystal panel, and the second front light unit is operated to cause a second image to be displayed on the front side of the liquid crystal panel.

16. The device according to claim 13 wherein the scattering film is prepared between the first polarizing plate and the first front light unit and prevents Moiré phenomenon from occurring when an image is displayed on the rear side of the liquid crystal panel due to a light emitted from the first front light unit.

17. The device according to claim 13, wherein the scattering film is prepared between the second polarizing plate and the second front light unit and prevents Moiré phenomenon from occurring when an image is displayed on the front side of the liquid crystal panel due to a light emitted from the second front light unit.

18. A method of fabricating a dual LCD device, comprising:
providing a liquid crystal panel having a liquid crystal layer interposed between a first substrate and a second substrate;

providing first and second polarizing plates on opposing surfaces of the liquid crystal panel;

providing a first front light unit having a first side on a front side of the liquid crystal panel; and providing a second front light unit having a first side on a rear side of the liquid crystal panel, wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations, wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

19. The method according to claim 18, wherein the first and second polarizing plates are provided on both surfaces of the liquid crystal panel such that optical axes of the first and second polarizing plates are perpendicular to each other.

20. The method according to claim 18, wherein the first front light unit is operated to cause a first image to be displayed on the rear side of the liquid crystal panel, and the second front light unit is operated to cause a second image to be displayed on the front side of the liquid crystal panel.

21. A method of fabricating a dual LCD device, comprising:

providing a liquid crystal panel having a liquid crystal layer interposed between a first substrate and a second substrate;

providing first and second polarizing plates to opposing surfaces of the liquid crystal panel;

providing a first front light unit having a first side on a front side of the liquid crystal panel;

providing a second front light unit having a first side on a rear side of the liquid crystal panel; and providing a fine reflecting and scattering film between one of the first polarizing plate and the first front light unit, and the second polarizing plate and the second front light unit, wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations, wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

22. The method according to claim 21, wherein the first and second polarizing plates are provided on both surfaces of the liquid crystal panel such that optical axes of the first and second polarizing plates are perpendicular to each other.

23. The method according to claim 21, wherein the first front light unit is operated to cause a first image to be displayed on the rear side of the liquid crystal panel, and the second front light unit is operated to cause a second image to be displayed on the front side of the liquid crystal panel.

24. The method according to claim 21, wherein the fine reflecting and scattering film is provided between the first polarizing plate and the first front light unit and receives ambient light supplied from the rear side of the liquid crystal panel and reflects the received ambient light to the rear side of the liquid crystal panel.

25. The method according to claim 24, wherein the fine reflecting and scattering film is provided between the first polarizing plate and the first front light unit and enhances a brightness of the image displayed on the rear side of the liquid crystal panel.

26. The method according to claim 21, wherein the fine reflecting and scattering film is provided between the second polarizing plate and the second front light unit and receives ambient light supplied from the front side of the liquid crystal panel and reflects the received ambient light to the front side of the liquid crystal panel.

27. The method according to claim 26, wherein the fine reflecting and scattering film is provided between the second polarizing plate and the second front light unit and enhances a brightness of the image displayed on the front side of the liquid crystal panel.

28. The method according to claim 21, wherein the fine reflecting and scattering film is provided between the first polarizing plate and the first front light unit and prevents Moiré phenomenon from occurring when an image is displayed on the rear side of the liquid crystal panel due to a light emitted from the first front light unit.

29. The method according to claim 21, wherein the fine reflecting and scattering film is provided between the second polarizing plate and the second front light unit and prevents Moiré phenomenon from occurring when an image is displayed on the front side of the liquid crystal panel due to a light emitted from the second front light unit.

30. A method of fabricating a dual LCD device, comprising:

providing a liquid crystal panel having a liquid crystal layer interposed between a first substrate and a second substrate;

providing first and second polarizing plates on opposing surfaces of the liquid crystal panel;

providing a first front light unit having a first side on a front side of the liquid crystal panel;

providing a second front light unit having a first side on a rear side of the liquid crystal panel; and providing a scattering film between one of the first polarizing plate and the first front light unit, and the second polarizing plate and the second front light unit, wherein the first and second front light units are disposed at opposite sides of the liquid crystal panel, the first and second front light units overlap each other with the liquid crystal panel disposed therebetween, and the first and second front light units each have second sides opposite to the first sides having prismatic configurations, wherein the liquid crystal panel functions in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode, and wherein the liquid crystal panel functions in a TN mode, such that the second front light unit is in an ON state and an image displayed on the front side of the liquid crystal panel is in a black mode, and the second front light unit is in an OFF state and an image displayed on the front side of the liquid crystal panel is in a white mode.

31. The method according to claim 30, wherein the first and second polarizing plates are provided on both surfaces of the liquid crystal panel so that optical axes of the polarizing plates are perpendicular to each other.

32. The method according to claim 30, wherein the first front light unit is operated to cause a first image to be displayed on the rear side of the liquid crystal panel, and the second front light unit is operated to cause a second image to be displayed on the front side of the liquid crystal panel.

33. The method according to claim 30, wherein the scattering film is provided between the first polarizing plate and the first front light unit and prevents Moiré phenomenon from occurring when an image is displayed on the rear side of the liquid crystal panel due to a light emitted from the first front light unit.

34. The method according to claim 30, wherein the scattering film is provided between the second polarizing plate and the second front light unit and prevents Moiré phenomenon from occurring when an image is displayed on the front side of the liquid crystal panel due to a light emitted from the second front light unit.

* * * * *